United States Patent
Shimada et al.

(10) Patent No.: US 6,438,571 B1
(45) Date of Patent: Aug. 20, 2002

(54) ADDER CIRCUIT

(75) Inventors: Michio Shimada; Sachio Nakaigawa, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/428,537

(22) Filed: Oct. 28, 1999

(30) Foreign Application Priority Data

Oct. 28, 1998 (JP) .......................... 10-306225

(51) Int. Cl.⁷ ................................. G06F 7/50
(52) U.S. Cl. ...................... 708/707; 708/710
(58) Field of Search ................ 708/707, 710

(56) References Cited

U.S. PATENT DOCUMENTS 5,065,353 A * 11/1991 Nojiri et al. ............ 708/707
5,109,480 A * 4/1992 Sone et al. ............. 708/707

FOREIGN PATENT DOCUMENTS

| JP | 3-75925 | 3/1991 |
| JP | 8-123662 | 5/1996 |
| JP | 9-167080 | 6/1997 |

* cited by examiner

*Primary Examiner*—Tan V. Mai
(74) *Attorney, Agent, or Firm*—Foley & Lardner

(57) ABSTRACT

An adder circuit can perform of two integers respective consisted of n=k m bits at high speed with a smaller scale circuit than that of an adder circuit employing a carry look ahead circuit. The adder circuit includes m in number of k-bit adding circuits connected in serial connection in such a manner that an carry output in a preceding digit is supplied to a carry input in a following digit, m in number of carry propagation alarm circuits provided corresponding to respective of m in number of k-bit adding means, for outputting carry propagation alarm signal only when carry input of corresponding adding means is propagated to a carry output, and OR circuit for performing OR for performing OR operation of the m in number of carry propagation alarm signals for generating a carry alarm signal, for leading a fixed result of addition from a final digit of the adding means in serial connection after extinction of generation of the carry alarm signal.

9 Claims, 9 Drawing Sheets

ADDER CIRCUIT

BACKGROUND OF THE INVENTION

1. Field of the Invention

The present invention relates generally to an adder circuit. More particularly, the invention relates to a carry look ahead system of a full adder circuit.

2. Description of the Related Art

An adder circuit has been used in various systems, such as a general purpose computer and so forth. In order to speed-up the adder circuit, a carry look ahead circuit has been used conventionally. It has been known that while a calculation period of n-bit adder circuit formed by serial connection of n in number of full adder circuits is proportional to n, the calculation period can be shortened in the extent of proportional to $\log_2 n$ by adding the carry look ahead circuit. It should be noted that the conventional carry look ahead circuit has been disclosed in Japanese Unexamined Patent Publication No. Heisei 8-123662 and Japanese Unexamined Patent Publication No. Heisei 9-167080, for example.

Figure 8:
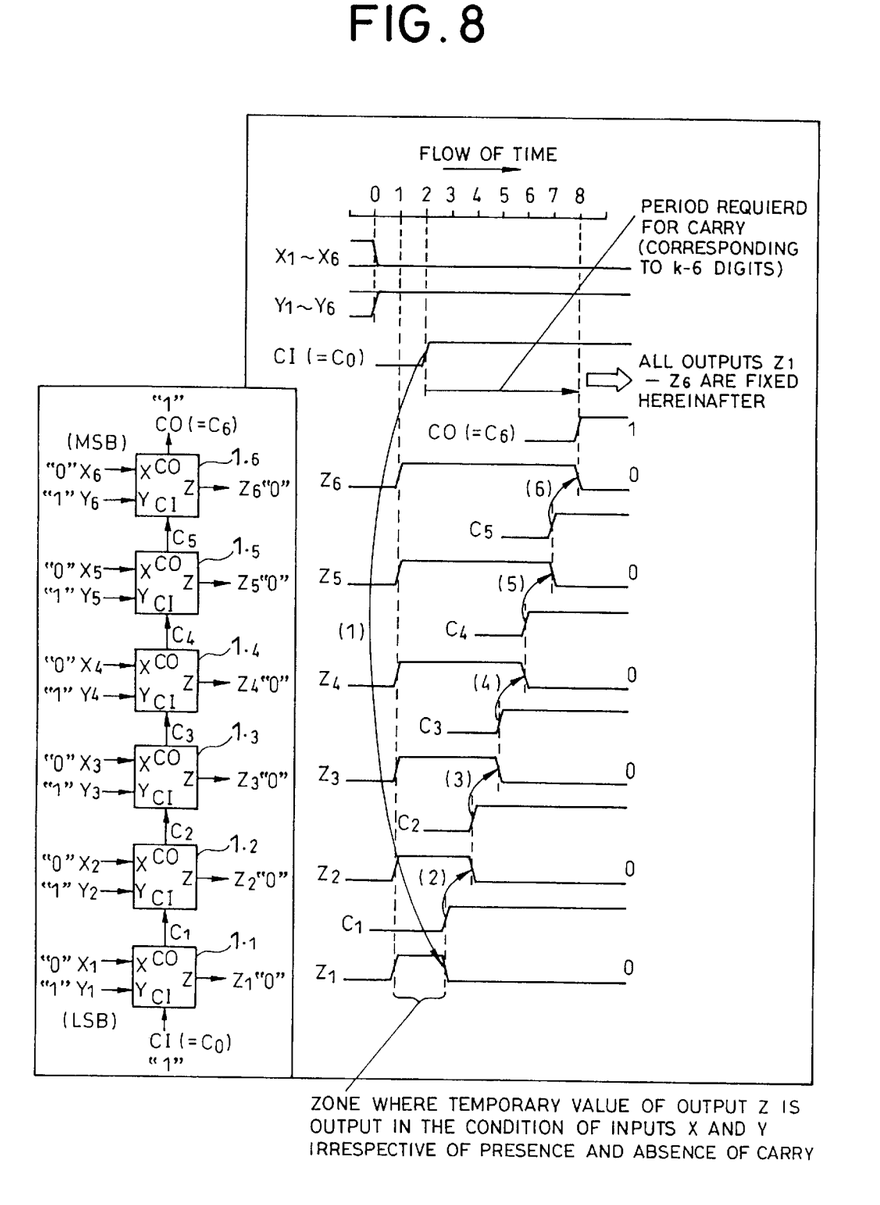
FIG. 8 is an illustration for explaining one example for explaining necessity of a carry look ahead circuit.
Figure 9:
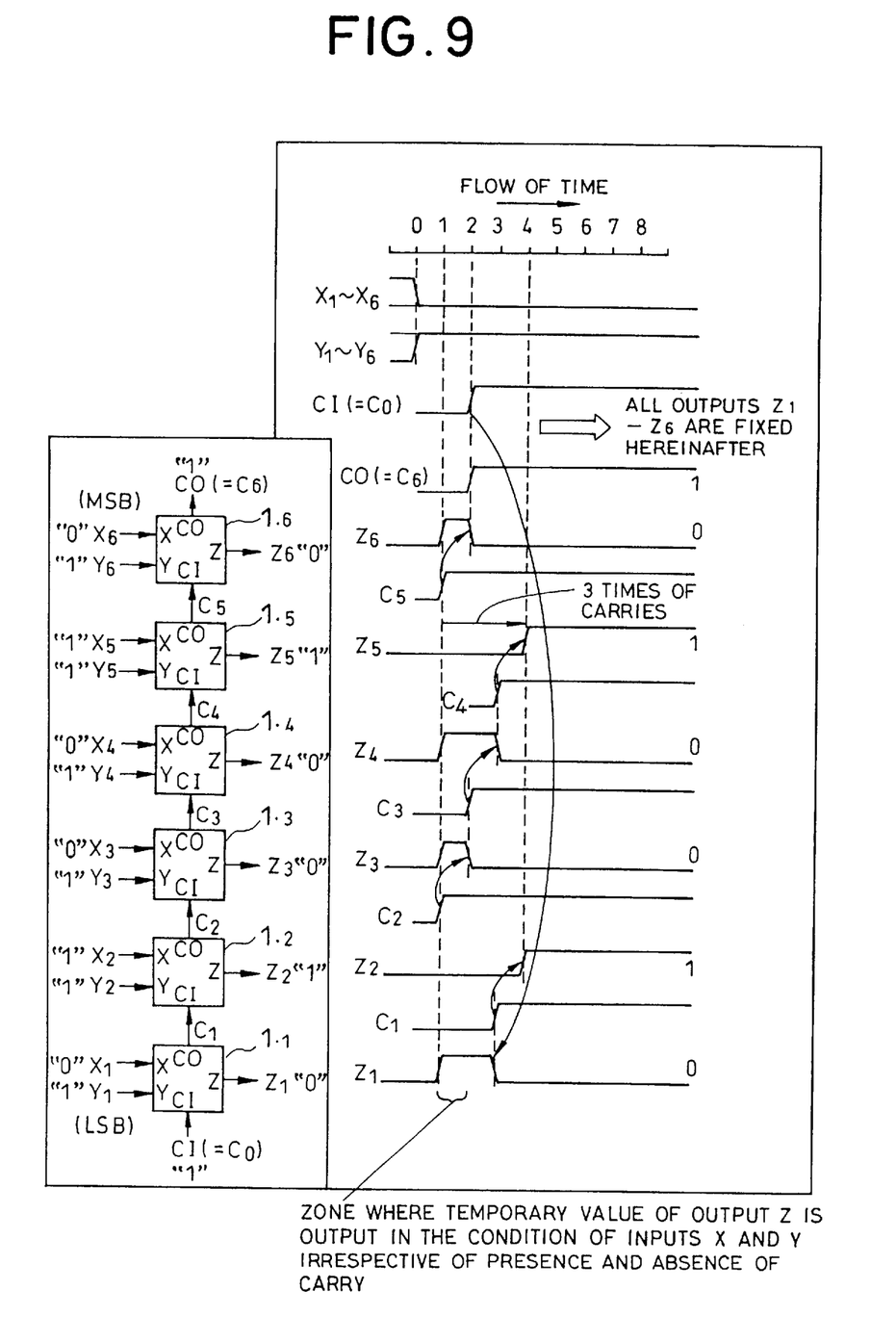
FIG. 9 is an illustration for explaining another example for explaining necessity of the carry look ahead circuit.

Necessity of the carry look ahead circuit will be discussed hereinafter with reference to FIGS. 8 and 9. In FIGS. 8 and 9, there are illustrated block diagrams showing example of adder circuits in the case of performing addition of two 6-bit integers $\underline{X}$ and $\underline{Y}$. Full adders 1.1 to 1.6 for the least significant bits $(X_1, Y_1)$ to the most significant bits $(X_6, Y_6)$ are sequentially connected in serial connection so that respective carry outputs CO (generally representing $C_1$ to $C_5$) in the preceding digits are supplied to carry inputs CI in the next digit. Respective results of addition are shown as $Z_1$ to $Z_6$ and final carry is taken as CO.

FIG. 8 shows a timing chart illustrating an example of calculation in the case where $(X_i, Y_i)$ is $(0, 1)$, and a carry input of the initial digit is "1". On the other hand, FIG. 9 shows a timing chart illustrating an example of calculation in the case where $(X_1, Y_1)$, $(X_3, Y_3)$, $(X_4, Y_4)$, $(X_6, Y_6)$ are $(1, 0)$ and $(X_2, Y_2)$, $(X_5, Y_5)$ are $(1, 1)$, and the carry input CI in the initial digit is "1".

The example of FIG. 8 shows the case where carry is caused in every digit in the six digits. Therefore, it can be appreciated that correct result of addition cannot be obtained until a flow of time (sequence of operation) becomes "8". On the other hand, in the example of FIG. 9, the correct result of addition can be obtained at and after time flow "4". In FIG. 9, considering the case that carry is caused sequentially, it can be appreciated that a correct output can be obtained by waiting three times of carry at minimum.

In the adder circuit constructed with a plurality of full adders connected in serial connection in the condition where the carry look ahead circuit is not provided, it cannot be known how long waiting period is required for determining the output with the carries unless the input data $\underline{X}$ and $\underline{Y}$ to be added are determined as in the examples shown in FIGS. 8 and 9. Therefore, in consideration of the worst case as exemplarily illustrated in FIG. 8, a waiting period permitting occurrence of carry in every digits is preliminarily provided to take out the output from the full adder in the final digit after the preset waiting period.

However, by checking how long waiting period is required in all of n-bit input data $\underline{X}$ and $\underline{Y}$ respectively, it can be appreciated that an average waiting period is a value proportional to $\log_2 n$. This means that if an input data is assumed to be a random value, the correct result of calculation can be obtained by waiting for a preliminarily set waiting period proportional to $\log_2 n$ unconditionally.

In the general purpose computer or so forth, the adder circuit is typically used for performing addition of integer of thirty-two to sixty-four bits. In the recent year, in a public-key cryptosystem or so forth, it has been required to perform addition of large number of digits in the extent of a thousand twenty-four to two thousands forty-eight bits. However, if addition is attempted to speed-up by means of the conventionally known carry look ahead circuit in order to satisfy such requirement, for example, scale of the circuit inherently becomes large.

SUMMARY OF THE INVENTION

It is an object of the present invention to provide an adder circuit which can perform addition at high speed with a smaller scale circuit than that of an adder circuit employing a carry look ahead circuit.

In order to accomplish the above-mentioned and other objects, according to the first aspect of the present invention, an adder circuit performing addition of two integers respective consisted of n=k m bits wherein n, m and k are integers, comprises:

m in number of k-bit adding means connected in serial connection in such a manner that an carry output in a preceding digit is supplied to a carry input in a following digit;

m in number of carry propagation alarm means provided corresponding to respective of m in number of k-bit adding means, for outputting carry propagation alarm signal only when carry input of corresponding adding means is propagated to a carry output; and OR means for performing OR for performing OR operation of the m in number of carry propagation alarm signals for generating a carry alarm signal, wherein a fixed result of addition is derived from a final digit of the adding means in serial connection after extinction of generation of the carry alarm signal.

The adder circuit may further comprise means for leading the fixed result of addition after expiration of a given period which is set longer than a period for addition in each of the adding means and after extinction of the carry alarm signal.

According to the second aspect of the present invention, an adder circuit performing addition of two integers respective consisted of n=k m+b bits wherein n, m, b and k are integers, comprises:

m in number of k-bit adding means connected in serial connection in such a manner that an carry output in a preceding digit is supplied to a carry input in a following digit, and a single b-bit adding means;

m in number of carry propagation alarm means provided corresponding to respective of m in number of k-bit adding means, for outputting carry propagation alarm signal only when carry input of corresponding adding means is propagated to a carry output; and OR means for performing OR for performing OR operation of the m in number of carry propagation alarm signals for generating a carry alarm signal, wherein a fixed result of addition is derived from a final digit of the adding means in serial connection after extinction of generation of the carry alarm signal.

The m in number of k-bit adding means may be provided for each of m in number of blocks in the case where n bits of the two integer are divided into a b-bit lowermost block and into 1+m in number of blocks by dividing each s sequentially per k bits for performing addition of corresponding pair of k-bit blocks. Each of the k-bit adding means may be k-bit full adders.

In the preferred construction, each of the m in number of carry propagation alarm means may comprise:

k in number of exclusive OR means for performing exclusive OR operation of respective of corresponding bits of the two integers;

first AND means for performing AND operation of k in number of exclusive OR outputs;

single exclusive OR means for performing exclusive OR operation of the carry input and the carry output of the corresponding adding means; and second AND means for performing AND operation of an output of the single exclusive OR means and an output of the first AND means, output of the second AND means serving as the carry propagation alarm signal.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 1:
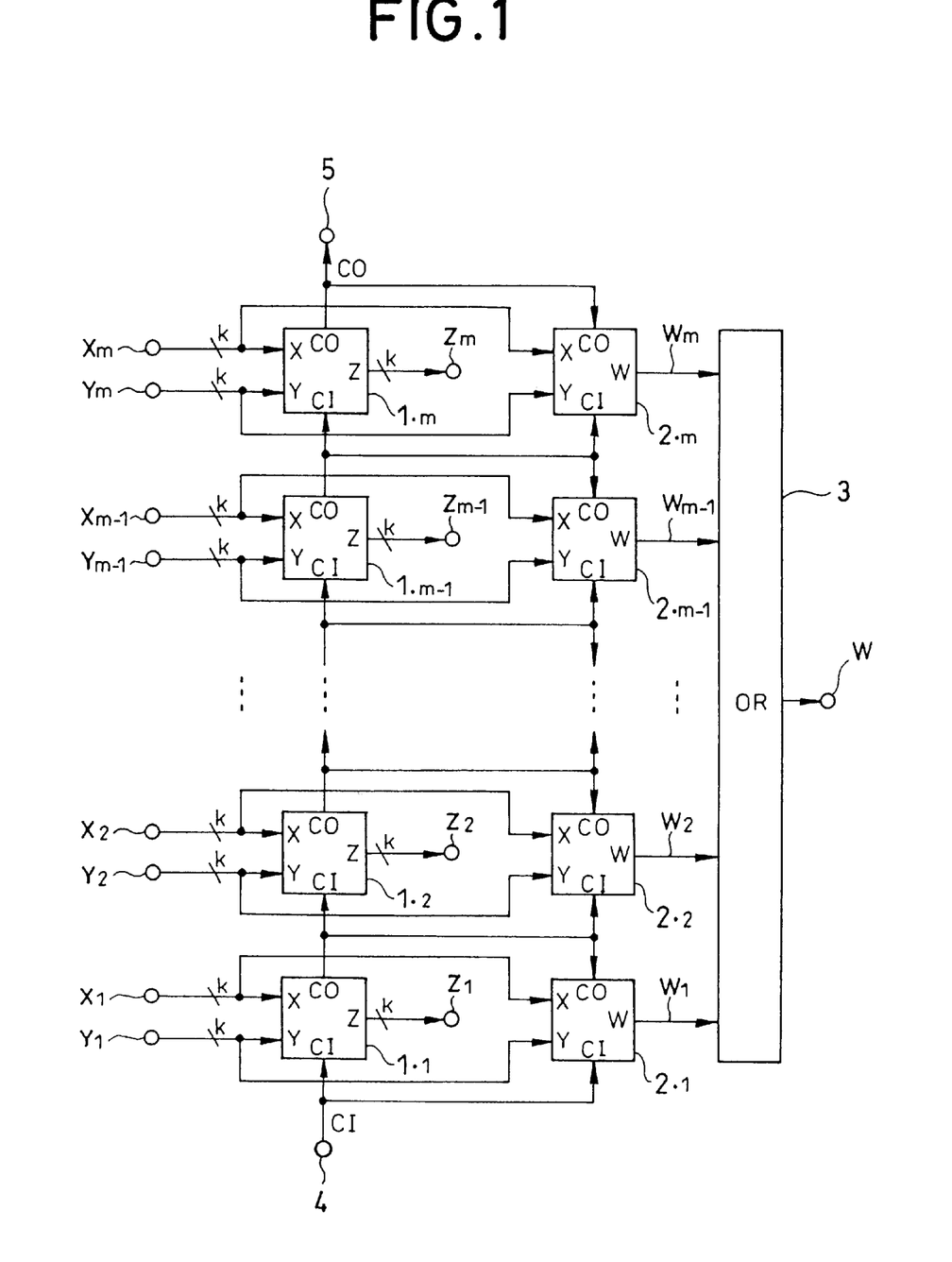
FIG. 1 is a block diagram of the first embodiment of an adder circuit in accordance with the present invention.
Figure 2:
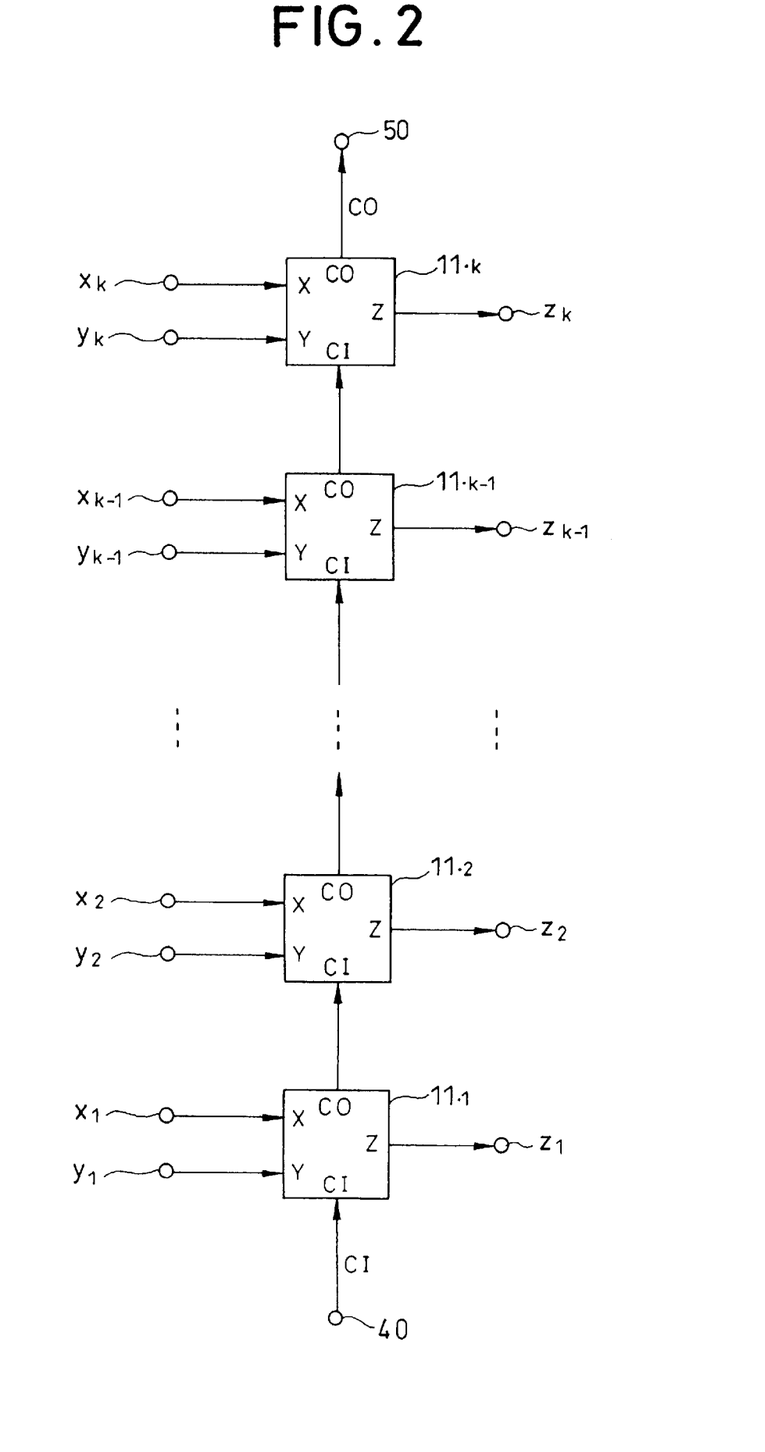
FIG. 2 is an illustration showing an example of the adder circuits 1.1 to 1.m in FIG. 1.

FIG. 1 shows the first embodiment of an adder circuit according to the present invention. As shown in FIG. 1, m in number of k-bit adder circuits 1.1 to 1.m are sequentially connected in serial connection so that a carry output CO of a former digit is supplied to a carry input CI of a next digit. These k-bit adder circuit is formed by serial connection of k in number of full adders, as shown in FIG. 2.

Corresponding to respective of m in number of adder circuits 1.1 to 1.m, m in number of k-bit carry propagation alarm circuits 2.1 to 2.m are provided. Each of these k-bit carry propagation alarm circuit outputs "1" upon detection of propagation of carry (or bring down) over k-bits of each of corresponding adder circuit, and outputs "0" otherwise. The k-bit carry propagation alarm circuit 2.i (i is integer in a range of 1 to m) takes inputs $X_i$ and $Y_i$ of the corresponding k-bit adder circuit 1.i as inputs X, Y, and takes the carry input and the carry output of the corresponding k-bit adder circuit as the carry input CI and the carry output CO, respectively.

In order to calculate OR of respective outputs $W_1$ to $W_m$ of the k-bit carry propagation alarm circuits 2.1 to 2.m, an OR circuit 3 is provided. It should be noted that, in the following description, each calculation period (delay period) of each of the adder circuits 1.1 to 1.m is referred to as τ, and an output of the OR circuit 3 is referred to as a carry alarm signal W.

On the other hand, an average of a maximum length of carry propagation which can be caused during addition of n-bit integer is in an extent of $\log_2 n$ bits as set forth above (a calculation period of the conventional n-bit adder circuit speeded-up by the carry look ahead circuit is proportional to $\log_2 n$.). The k-bit carry propagation alarm circuits 2.1 to 2.m and the OR circuit 3 are smaller in size in comparison with those in the conventional carry look ahead circuit. Accordingly, assuming n=km, values of m and k are selected in the extent to approximately satisfy $\log_2 n$=k, and outputting the output of the adder circuit 1.m of the final digit at a timing after waiting more than or equal to τ after setting the input, and further waiting that the carry alarm signal is held "0" for a period longer than or equal to τ, addition of n-bit integer can be performed at high speed (namely, in a calculation period in the extent proportional to $\log_2 n$) equivalent to that of the conventional adder circuit, with smaller circuit than that of the conventional adder circuit.

Hereinafter, detail of the embodiment of the adder circuit according to the present invention will be discussed. It should be noted that n=km is assumed in the following discussion. The adder circuit shown in FIG. 1 has m in number of k-bit adder circuits 1.1 to 1.m, m in number of carry propagation alarm circuits 2.1 to 2.m and the logic circuit 3. In FIG. 1, among blocks (k-bit integer) established by dividing n(=km)-bit integer X per k bits, the block $X_i$ of the (i)th sequential order as counted from the least significant bit is input through the input terminal and is supplied to the terminal X of the k-bit adder circuit 1.i and the terminal X of the k-bit carry propagation alarm circuit 2.i.

On the other hand, among blocks established by dividing the n((=km)-bit integer Y per k bits, the block $Y_i$ of the (i)th order as counted from the least significant bit is input through the input terminal and is supplied to the terminal Y of the k-bit adder circuit 1.i and the terminal Y of the k-bit carry propagation alarm circuit 2.1. The carry input CI is input through the input terminal 4 and supplied to the terminal CI of the initial digit adder circuit 1.1 and to the terminal CI of the k-bit carry propagation alarm circuit 2.1. For i=1, 2, ..., m−1, the output from the terminal CO of the k-bit adder circuit 1.i is supplied to the terminal CI of the k-bit adder circuit 1. i+1 in the next digit and to the terminal CI of the k-bit carry propagation alarm circuit 2. i+1.

The output from the terminal CO of the k-bit adder circuit 1.m is output from an output terminal 5 as the carry output CO, and in conjunction therewith, is supplied to the terminal CO of the k-bit carry propagation alarm circuit 2.m. A k-bit output $Z_i$ is lead from the output terminal Z of the k-bit adder circuit 1.i. Outputs $W_i$ from all of the k-bit carry propagation alarm circuit 2.i are supplied to the OR circuit 3 and then, the output of the OR circuit is lead as the carry alarm signal W.

It should be noted that the k-bit adder circuit 1.i adds the k-bit integer $X_i$ supplied to the terminal X and the k-bit integer $Y_i$ supplied to the terminal Y and the value supplied to the terminal CI respectively as augend, addend and the carry input to output the k-bit result of addition $Z_i$ through the terminal Z, and to output the carry caused during addition through the terminal CO.

The k-bit adder circuit 1.1 of FIG. 1 is constructed as illustrated in FIG. 2. In FIG. 2, the output terminal 50 corresponds to the terminal CO of the k-bit adder circuit 1.1 and inputs $x_1$ to $x_k$ and $y_1$ to $y_k$ respectively correspond to terminals X and Y of the k-bit adder circuit 1.1. An input terminal 40 corresponds to the terminal CI of the k-bit adder circuit 1.1 and outputs $z_1$ to $z_k$ respectively correspond to the terminal Z of the k-bit adder circuit 1.1.

Then, the bit $x_i$ of the k-bit integer X in (i)th sequential order from the least significant bit is input and supplied to the terminal X of full adder circuits 11.i, and the bit $y_i$ of the k-bit integer Y in (i)th sequential order from the least significant bit is input and supplied to the terminal Y of full adder circuits 11.i. The carry input CI is input through the input terminal 40 and supplied to the terminal CI of the full adder 11.1. For i=1, 2, ..., k−1, the output from the terminal CO of the full adder 11.i is supplied to the terminal CI of the full adder circuit 11.i+1.

The output from the terminal CO of the full adder 11.k is output from an output terminal 50 as the carry output CO. The output bits $z_i$ from the terminal Z of the full adder circuit 11.i are output as outputs. It should be noted that full adder circuit 11.i performs full addition of the bits supplied to the terminal X, the bit supplied to the terminal Y and bits supplied to the terminal CI as augend, addend and carry input, respectively, and a 1-bit result of addition is output through the terminal Z, and the carry caused during addition is output from the terminal CO.

Thus, the k-bit adder circuit of FIG. 2 adds the k-bit integer $X_i$ supplied to the terminal X (inputs $x_1$ to $x_k$), the k-bit integer $Y_i$ supplied to the terminal Y (inputs $y_1$ to $y_k$) and a value supplied to the terminal CI (input terminal 40), as augend, addend and the carry input, respectively, to output a k-bit result of addition from the terminals Z (outputs $z_1$ to $z_k$), and to output the carry caused during addition from the terminal CO (input terminal 50). Other adder circuits 1.2 to 1.m have the same construction, respectively.

Figure 3:
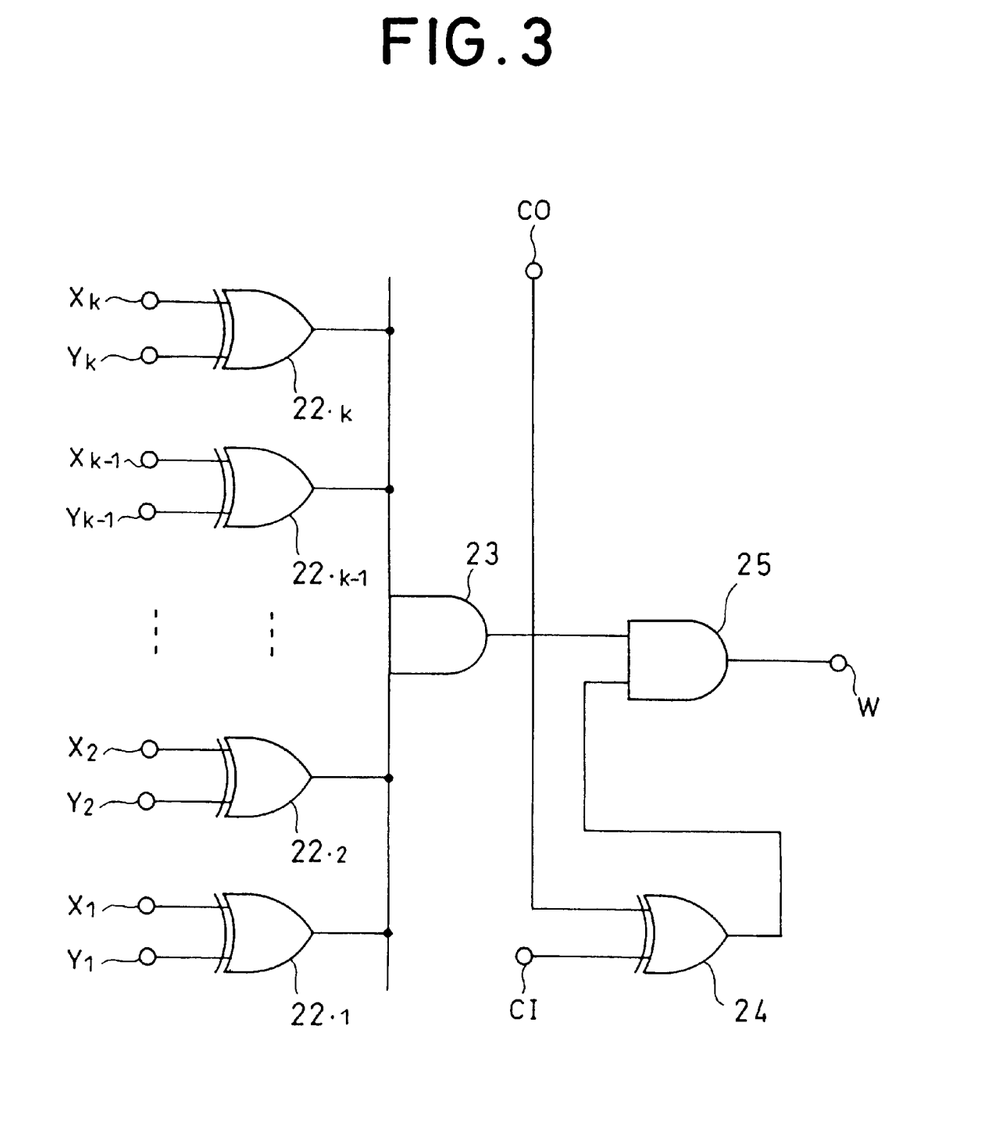
FIG. 3 is an illustration showing an example of propagation alarm circuits 2.1 to 2.n in FIG. 1.

The k-bit carry propagation alarm circuit 2.1 of FIG. 1 is constructed as illustrated in FIG. 3. The bit $X_i$ in the (i)th sequential order from the least significant bit of the k-bit integer X and the bit $Y_i$ of the (i)th sequential order from the least significant bit of the k-bit integer Y are supplied to an exclusive OR circuit 22.i. A result of calculation in the exclusive OR circuit 22.i is supplied to an AND circuit 23. The AND circuit 23 supplies a result of calculation to an AND circuit 25. The carry input CI and the carry output CO of the adder circuit 1.1 are supplied to an exclusive OR circuit 24 and the result of calculation in the exclusive OR circuit 24 is supplied to the AND circuit 25.

The result of calculation of the AND circuit 25 is output as the carry propagation alarm signal $W_1$. Thus, the k-bit carry alarm circuit of FIG. 3 sets the carry propagation alarm signal $W_1$ to "1" when the carry (or bring down) is caused over k bits and to "0" otherwise.

It should be noted that the full adders 11.1 to 11.k of FIG. 2 have been well known to those skilled in the art and are not directly related to the present invention, discussion of the detailed construction will be neglected for keeping the disclosure simple enough to facilitate clear understanding of the present invention.

Next, operation of the first embodiment of the adder circuit according to the present invention will be discussed hereinafter. It should be noted that, in the following discussion, a calculation period of each adder circuit 1.i is assumed to be τ. The k-bit carry propagation alarm circuit 2.i sets the carry propagation alarm signal $W_i$ to "1" only when the carry input CI of the k-bit adder circuit 1.i is propagated to the output CO, and set the carry propagation alarm signal $W_i$ to "0" otherwise. Therefore, when the k-bit carry propagation alarm circuit 2.i cannot detect propagation of carry in the case where the carry caused in the k-bit adder circuit 1.i is propagated to the output CO, where the propagation of the carry input CI converges within the k-bit adder circuit 1.i or where the carry caused in the k-bit adder circuit 1.i converges within the k-bit adder circuit 1.i.

On the other hand, when the carry input CI of the certain k-bit adder circuit is propagated to the carry output CO of other k-bit adder circuit over a plurality of k-bit adder circuits, the carry propagation alarm signal $W_i$ becomes "1" in sequential order from the k-bit carry propagation alarm circuit 2.i corresponding to the k-bit adder circuit at the least significant digit. When $W_{i+1}$ becomes "1", $W_i$ becomes "0". Therefore, while the carry is propagated over a plurality of k-bit adder circuit, the carry alarm signal W output from the output terminal becomes "1".

Strictly speaking, due to fluctuation of the delay period of the exclusive OR circuit 24 (see FIG. 3) and the AND circuit (see FIG. 5) within the carry propagation alarm circuit 2.i, it is possible that $W_i$ becomes "0" before $W_{i+1}$ becomes "1". Even in such case, since a period where both of $W_{i+1}$ and $W_i$ become "0" is quite short, the carry alarm signal W output from the AND circuit 3 will never become "0" when m is sufficiently large (thus, response of the AND circuit 3 relative to variation of the input becomes low).

Accordingly, in order to add the n(=km)-bit integer X and n-bit integer Y with the carry input CI by using the adder circuit according to the present invention, the following processes are performed. It should be noted that, in the following discussion, a certain period T is a preliminarily determined constant satisfying T>τ. At first, among blocks (k-bit integer) established by dividing n-bit integer X per k bits, a block (k-bit integer) $X_i$ in the (i)th sequential order from the least significant bit is supplied to corresponding input terminals, among blocks (k-bit integer) established by dividing n-bit integer Y per k bits, a block (k-bit integer) $Y_i$ in the (i)th sequential order from the least significant bit is supplied to corresponding input terminals, and the carry input CI is supplied to the input terminal 4.

Subsequently, after waiting for a period T, waiting state is held until the carry propagation alarm signal is maintained "0" over the period T. Then, the result of addition of n bits can be obtained as outputs $Z_1$ to $Z_m$, and carry caused during addition is obtained at the output terminal 5.

Figure 5:
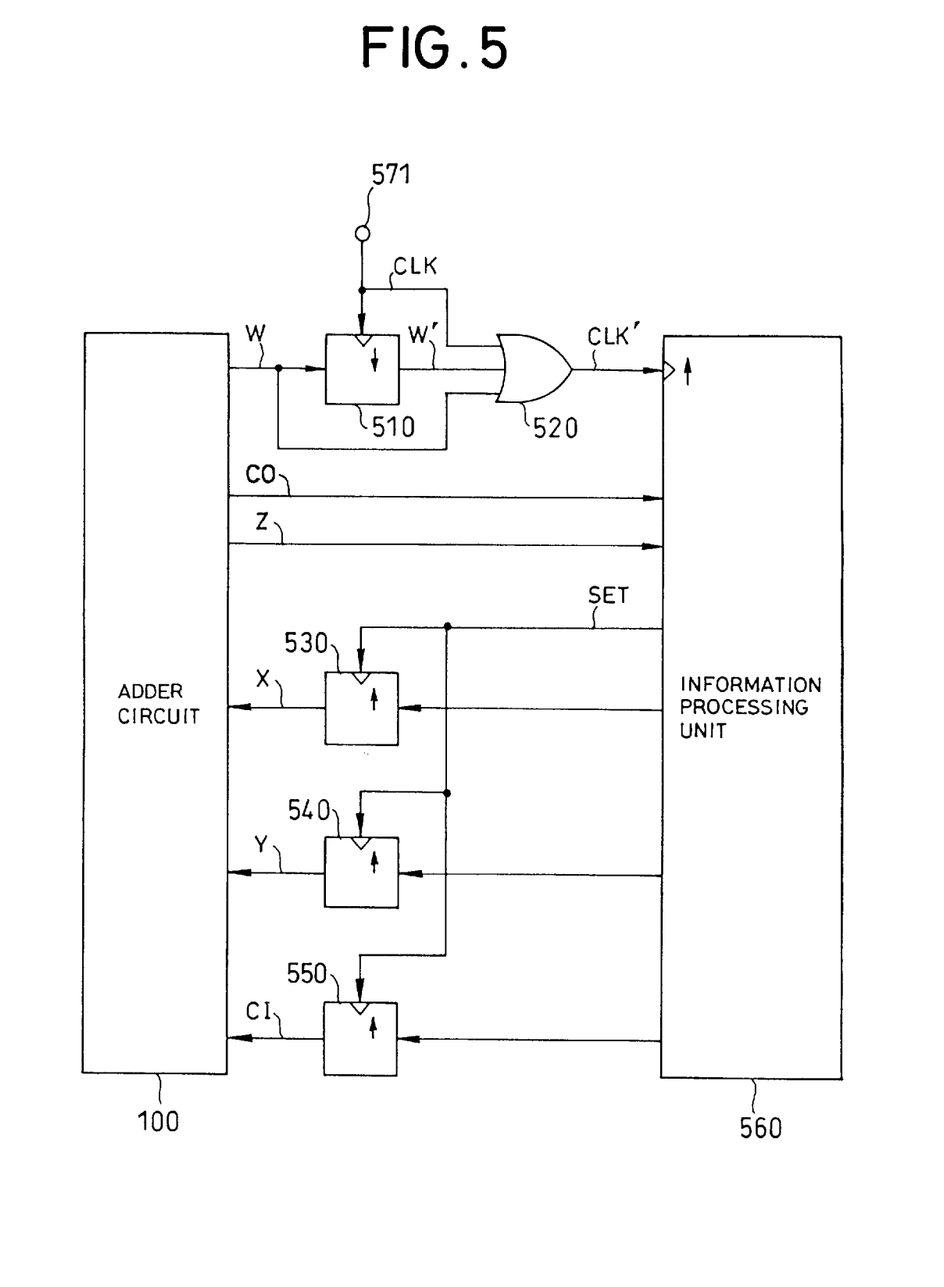
FIG. 5 is a block diagram for explaining an output processing method of the adder circuit according to the present invention.

A circuit in which the result of addition $Z_i$ is externally output after the period T from supplying inputs $X_i$ and $Y_i$ to be added and waiting that the carry alarm signal W is maintained "0" over the period T, is necessary. The circuit such that has been well known to those skilled in the art. Example will be discussed hereinafter. FIG. 5 is a block diagram showing a relationship between the adder circuit 100 according to the present invention which is illustrated in FIGS. 1 to 3 and an information processing unit 560 which make the result of addition reference to.

In FIG. 5, the carry alarm signal W output from the adder circuit 100 is supplied to a register 510 and an OR circuit 520. The register 510 latches a value of the carry alarm signal W in response to falling of a system clock CLK supplied from an input terminal 571 to "0" (latching timing of the input value upon falling of the clock in the clock input terminal of the register is illustrated by a downward arrow). Even in other register or the like, latching timing of the input data is indicated by direction of the arrow. The latched value W' is output to the OR circuit 520.

The OR circuit 520 calculates OR of the clock CLK, W and W' and supplies the result of calculation CLK' to the clock input terminal of the information processing unit 560. The information processing unit 560 updates internal condition according to a predetermined procedure when the clock CLK' supplied to the clock input terminal rises from "0" to "1". Then, when the information processing unit adds the carry input to km-bit integers X and Y as CI, X is supplied to the register 530, Y is supplied to the register 540 and CI is supplied to a register 550. Next, supplying one clock pulse as a control signal SET, the km-bit integer Z and the carry output CO supplied from the adder circuit 100 are taken as the result of addition.

The registers 530, 540 and 550 hold respective values of X, Y and CI in response to rising of the control signal SET from "0" to "1" and supply the held values to respectively corresponding input terminal of the adder circuit 100. The adder circuit 100 performs addition set forth above, outputs the carry alarm signal W and outputs the km-bit integer Z and the carry output CO as the result of addition.

Figure 6:
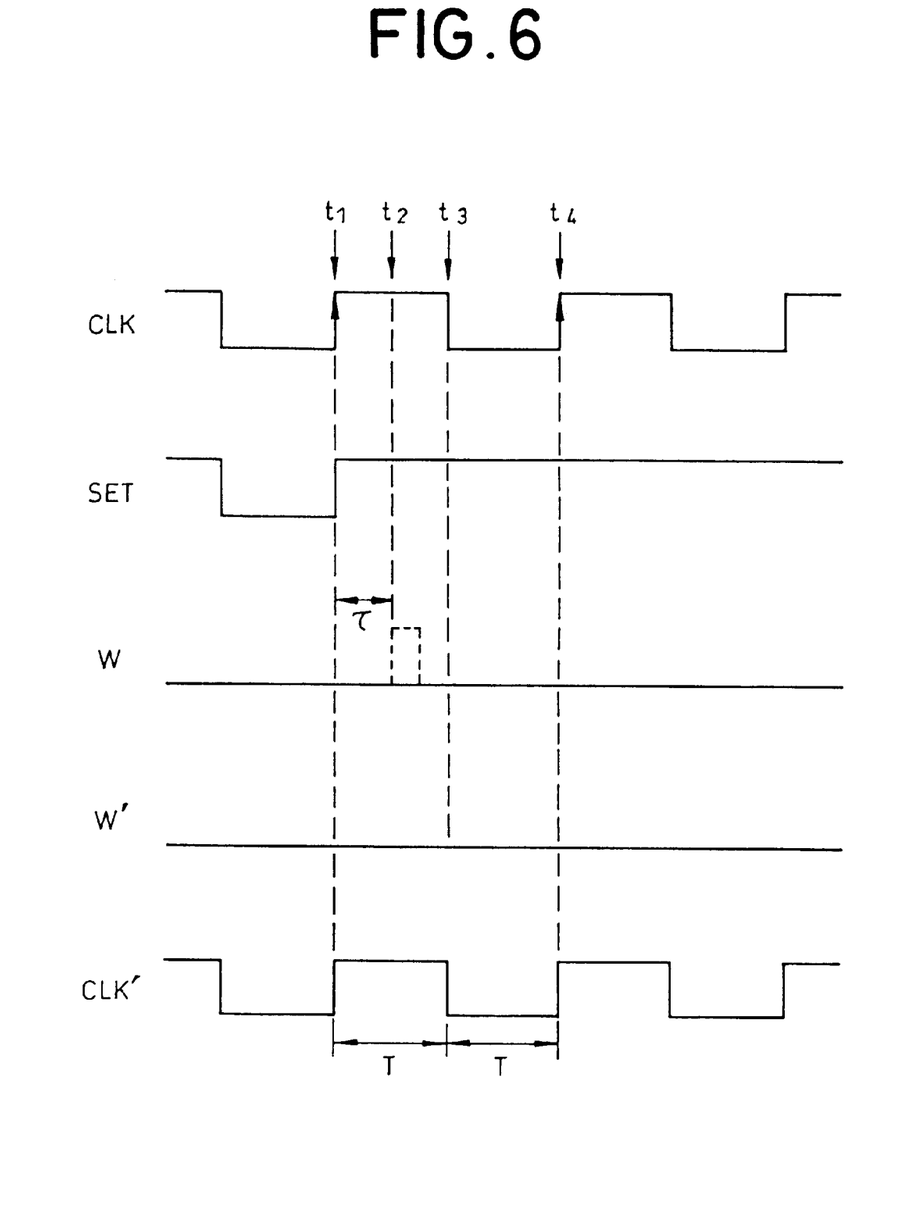
FIG. 6 is a timing chart showing one example of operation of the adder circuit shown in FIG. 5.

FIG. 6 is a timing chart showing operation of a connection circuit of FIG. 5 in the case where the carry alarm signal W is held "0" or becomes "1" for a short period (less than a period T−τ) after a period τ from initiation of addition. It should be noted that an initial value of a value held in the register 510 is assumed "0". On the other hand, a clock period of the clock signal CLK is assumed as 2T.

In FIG. 6, the control signal SET rises from "0" to "1" at a timing $t_1$ and inputs X, Y and CI to the adder circuit 100 are determined. When the carry alarm signal W is held "0" or becomes "1" for a short period (less than a period of T−τ) at a timing $t_2$ (namely, after a period τ from the timing $t_1$), the carry alarm signal W after a timing $t_3$ is held "0". Then, since the value of W, namely "0" is held in the register 510 at a timing $t_3$, the value of W' maintains "0" after a timing $t_3$, and thereafter, the output CLK' of the OR circuit 520, namely OR of CLK, W' and W, varies similarly to CLK.

Then, at a timing $t_4$, the information processing unit 560 takes the outputs Z and CO of the adder circuit 100 as the result of addition. At the timing $t_4$, since a period longer than or equal to the period T has been elapsed from a timing where the carry alarm signal W becomes "0", the values of the outputs Z and CO of the adder circuit 100 become correct result of addition corresponding to the inputs X, Y and CI of the adder circuit 100.

Figure 7:
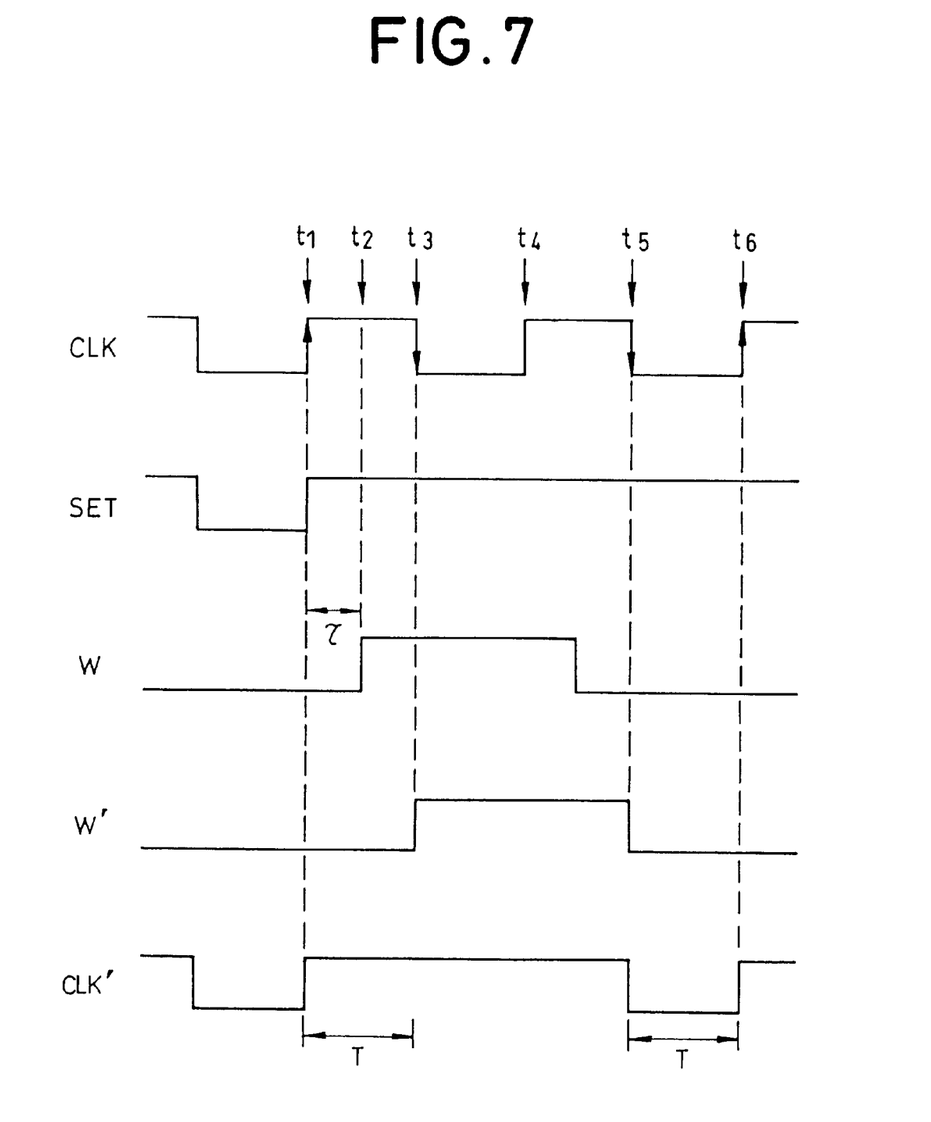
FIG. 7 is a timing chart showing another example of operation of the adder circuit shown in FIG. 5.

FIG. 7 is a timing chart showing operation of the connection circuit of FIG. 5 in the case where the carry alarm signal W is held "1" for a long period (longer than or equal to T−τ) after expiration of the period τ from initiation of addition. It should be noted that the initial value of the value held in the register 510 is assumed as "0". On the other hand, a clock period of the clock signal CLK is 2T.

In FIG. 7, the control signal SET rises from "0" to "1" at a timing $t_1$ and inputs X, Y and CI to the adder circuit 100 are determined. At a timing $t_2$, the carry alarm signal W becomes "1", and even after the timing $t_3$, the carry alarm signal W is held "1". Then, at the timing $t_3$, since the value of W, namely "1" is held in the register 510, the value of W' becomes "1" at and after the timing $t_3$.

Then, at and after a timing $t_5$ where the CLK signal falls down from "1" to "0", the carry alarm signal W becomes "0". At the timing $t_5$, the value of W, namely "0" is held in the register 510. The value of W' becomes "0" at and after the timing $t_5$. In this case, the output CLK' of the OR circuit 520, namely OR of CLK, W' and W becomes that one clock pulse from the timing $t_3$ to the timing $t_4$ is eliminated from CLK.

Therefore, the information processing unit 560 operated with taking CLK' as clock, stops operation at the timing $t_4$. Then, at a timing $t_6$, the information processing unit 560 takes the outputs Z and CO of the adder circuit 100 as the result of addition. At the timing $t_6$, since a period longer than or equal to the period T has already been elapsed from a timing where the carry alarm signal W becomes "0", the values of the outputs Z and CO of the adder circuit 100 becomes correct result of addition corresponding to the inputs X, Y and CI of the adder circuit 100.

It is noted that, when τ is smaller than the period of the clock by which the information processing unit operates and the carry alarm signal W is "1", the clock signal to the information processing unit may be stopped.

Figure 4:
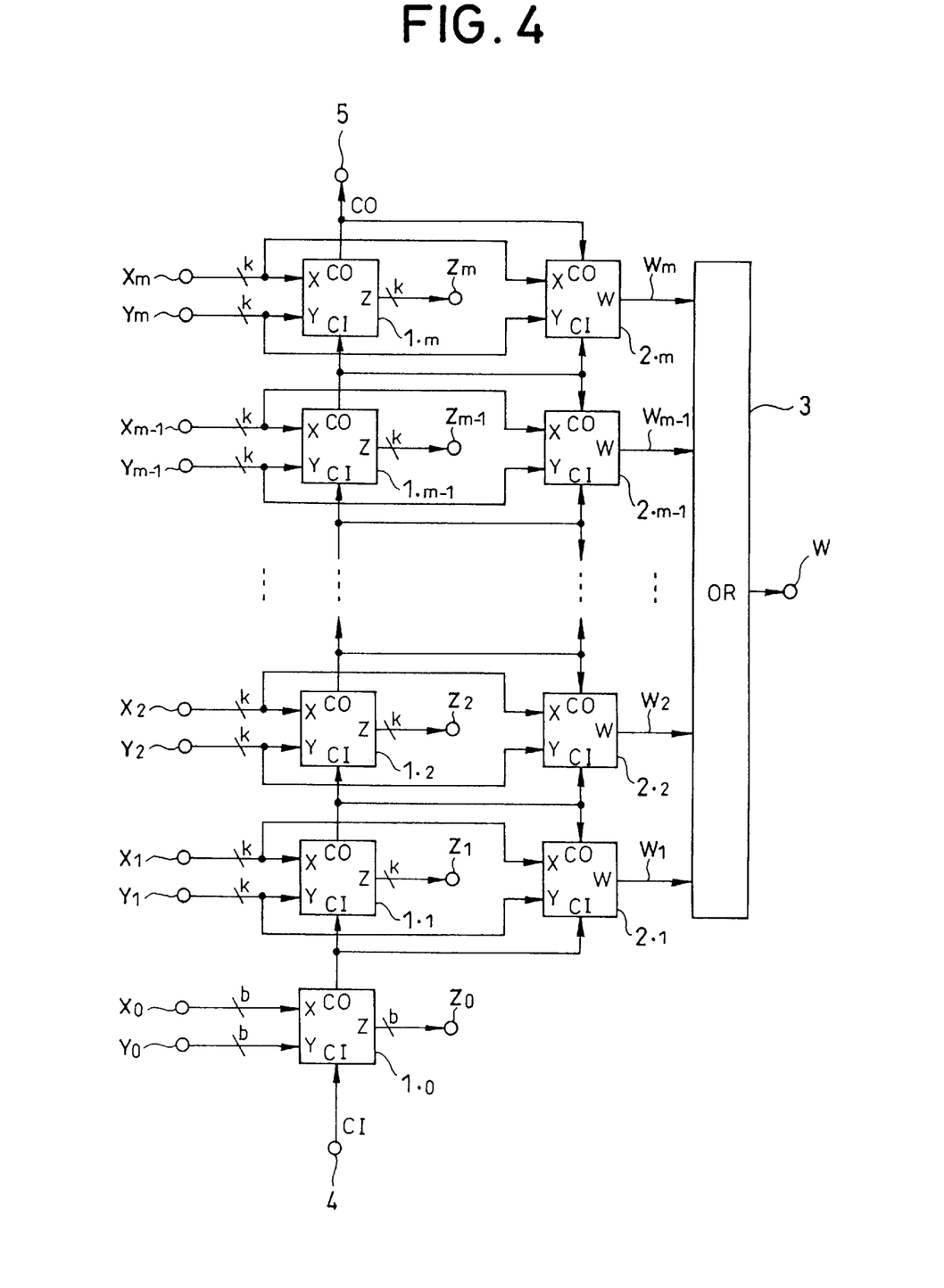
FIG. 4 is a block diagram of the second embodiment of an adder circuit in accordance with the present invention.

While k-bit carry propagation alarm circuits 2.i are added for respective of k-bit adder circuits 1.i, respectively in the shown embodiment, the similar effect can be obtained even when the k-bit carry propagation alarm circuits are not added for all of the adder circuits 1.i. A construction for realizing the foregoing modification is illustrated in FIG. 4 as the second embodiment. In the following discussion, it is assumed that n=km+b, $X_0$, $Y_0$ and $Z_0$ are lower b-bits of respective of n(=km+b) bit integer X, Y and Z, $(X_1, \ldots, X_m)$, $(Y_1, \ldots, Y_m)$ and $(Z_1, \ldots, Z_m)$ are respectively upper km bits of the n(=km+b) bit integers X, Y and Z.

In the shown embodiment, the adder circuits 1.1 to 1.m of FIG. 1 and an adder circuit 1.0 which is not provided the carry propagation alarm circuit, are provided. In FIG. 4, the carry input CI from the input terminal 4 is supplied to the terminal CI of the adder circuit 1.0. A b-bit integer $X_0$ is input and supplied to the terminal X of the adder circuit 1.0, and a b-bit integer $Y_0$ is input and supplied to the terminal Y of the adder circuit 1.0.

The adder circuit 1.0 takes CI as the carry input and performs addition of b-bit integer $X_0$ and b-bit integer $Y_0$ to output b-bit integer Z of the result of addition from the terminal $Z_0$, and to output the carry from the terminal CO in addition. It should be noted that the adder circuit 1.0 is constructed as the conventional adder circuit added the carry look ahead circuit. Other construction is similar to that of the embodiment shown in FIG. 1. Therefore, detailed description for the common parts with the first embodiment is neglected for keeping the disclosure simple enough to facilitate clear understanding of the present invention.

For adding the n(=km+b) bit integer X and n(=km+b) bit integer Y with the carry input as CI, using the adder circuit of FIG. 4, the following process may be taken. In the following discussion, the period T is set as a constant satisfying T>τ, and a calculation period (delay period) of the adder 1.0 is take as δ.

At first, the upper km bits of the n-bit integer X is divided per k bits for forming blocks. Among the blocks (k-bit integer) thus established, a block $X_i$ in the (i)th sequential order as counted from the lowermost block is supplied to respectively corresponding adder circuits 1.i and lower b-bit $X_0$ is supplied to the adder circuit 1.0, among blocks (k-bit integer) established by dividing the upper km bits of the n-bit integer Y, a block $Y_i$ in the (i)th sequential order as counted from the lowermost block is supplied to respectively corresponding adder circuits 1.i and lower b-bit $Y_0$ is supplied to the adder circuit 1.0, and the carry input CI is supplied to the input terminal 4.

Subsequently, after waiting for a period of T+δ, a timing where the carry alarm signal W is held "0" for the period T. Then, the results of addition of n bits are obtained at outputs $Z_0, Z_1, \ldots, Z_m$, and the carry caused during addition is obtained at the output terminal 5. Thus, if b is in a size of k, the scale of the circuit and the speed of the calculation may be equivalent to those in the first embodiment, but is advantageous in capability of executing addition of digits less than or equal to a predetermined bit length (e.g. 32 bits) within a period shorter than or equal to a given period. Therefore, the second embodiment permits to use the adder circuit for the general purpose computer which requires execution of addition within a period shorter than or equal to a given period, and the adder circuit for a cryptogram decoder for which execution of addition within the given period is not essential, in common.

It should be noted that the n(=km) bits are processed with dividing per k bits for establishing m blocks, it may also be possible to perform process with unevenly dividing n bits for convenience of wiring or when n is not divisible. On the other hand, as the exclusive OR circuits 22.1 to 22.k of the carry propagation alarm circuits 2.i, the exclusive OR circuits in the full adder circuits 11.i may used in common. Thus, scale of circuit can be made more compact.

As set forth above, in accordance with the present invention, by adding the carry propagation alarm circuit and the OR circuit to the serial adder circuit, and by waiting for converging of propagation of carry in the serial adder circuits, correct result of addition can be obtained. In such case, circuit size of the carry propagation alarm circuit and the OR circuit is smaller than the circuit size of the conventional carry look ahead circuit. Furthermore, through experiments, it has been found that an average of the maximum length of carry propagation to be caused in addition of two n-bit integers is in an extent of $\log_2 n$ bits. Accordingly, assuming n=km, by selecting values of k and m for approximately satisfying $\log_2 n$=k, it becomes possible to realize compact adder circuit which is high speed equivalent to the conventional adder circuit with the carry look ahead circuit and smaller than the conventional adder circuit with the carry look ahead circuit.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. An adder circuit performing addition of two integers respective consisted of n=k m bits wherein n, m and k are integers, comprising:

m in number of k-bit adding means connected in serial connection in such a manner that a carry output in a preceding digit is supplied to a carry input in a following digit;

m in number of carry propagation alarm means provided corresponding to respective of m in number of k-bit adding means, for outputting carry propagation alarm signal only when carry input of corresponding adding means is propagated to a carry output; and OR means for performing OR operation of said m in number of carry propagation alarm signals for generating a carry alarm signal, wherein a fixed result of addition is derived from a final digit of the adding means in serial connection after extinction of generation of said carry alarm signal.

2. An adder circuit as set forth in claim 1, which further comprises means for leading said fixed result of addition after expiration of a given period which is set longer than a period for addition in each of said adding means and after extinction of said carry alarm signal.

3. An adder circuit as set forth in claim 1, wherein said m in number of k-bit adding means are provided for each of m in number of blocks established by dividing each n bits of said two integers sequentially per k bits for performing addition of corresponding pair of k-bit blocks.

4. An adder circuit as set forth in claim 1, wherein each of said k-bit adding means are k-bit full adders.

5. An adder circuit as set forth in claim 1, wherein each of said m in number of carry propagation alarm means comprises:

k in number of exclusive OR means for performing exclusive OR operation of respective of corresponding bits of said two integers;

first AND means for performing AND operation of k in number of exclusive OR outputs;

single exclusive OR means for performing exclusive OR operation of said carry input and said carry output of the corresponding adding means; and second AND means for performing AND operation of an output of said single exclusive OR means and an output of said first AND means, output of said second AND means serving as said carry propagation alarm signal.

6. An adder circuit performing addition of two integers respective consisted of n=k m+b bits wherein n, m, b and k are integers, comprising:

m in number of k-bit adding means connected in serial connection in such a manner that a carry output in a preceding digit is supplied to a carry input in a following digit, and a single b-bit adding means;

m in number of carry propagation alarm means provided corresponding to respective of m in number of k-bit adding means, for an outputting carry propagation alarm signal only when carry input of corresponding adding means is propagated to a carry output; and OR means for performing OR operation of said m in number of carry propagation alarm signals for generating a carry alarm signal, wherein a fixed result of addition is derived from a final digit of the adding means in serial connection after extinction of generation of said carry alarm signal.

7. An adder circuit as set forth in claim 6, wherein said m in number of k-bit adding means are provided for each of m in number of blocks in the case where n bits of said two integer are divided into a b-bit lowermost block and into 1+m in number of blocks by dividing each sequentially per k bits for performing addition of corresponding pair of k-bit blocks.

8. An adder circuit as set forth in claim 6, wherein each of said k-bit adding means are k-bit full adders.

9. An adder circuit as set forth in claim 6, wherein each of said m in number of carry propagation alarm means comprises:
- k in number of exclusive OR means for performing exclusive OR operation of respective of corresponding bits of said two integers;
- first AND means for performing AND operation of k in number of exclusive OR outputs;
- single exclusive OR means for performing exclusive OR operation of said carry input and said carry output of the corresponding adding means; and
- second AND means for performing AND operation of an output of said single exclusive OR means and an output of said first AND means, output of said second AND means serving as said carry propagation alarm signal.

* * * * *